United States Patent [19]

Loose

[11] Patent Number: 4,700,976

[45] Date of Patent: Oct. 20, 1987

[54] BLIND LABEL

[75] Inventor: Joachim Loose, Petaluma, Calif.

[73] Assignee: Cetus Corporation, Emeryville, Calif.

[21] Appl. No.: 837,471

[22] Filed: Mar. 7, 1986

[51] Int. Cl.[4] .......... B42D 15/00; B42D 9/00; B31F 5/00; B32B 7/00

[52] U.S. Cl. .......... 283/101; 283/81; 156/204; 156/384

[58] Field of Search .......... 283/81, 84, 98, 101, 283/900, 901; 40/2 R, 306, 310; 156/52 A, 52 AC, 204, 384

[56] References Cited

U.S. PATENT DOCUMENTS

| | | | |
|---|---|---|---|
| 1,949,903 | 3/1934 | Fales | 40/310 |
| 2,825,159 | 3/1958 | Schor | 283/81 |
| 3,740,081 | 6/1973 | Whipperman | 283/81 |
| 3,750,317 | 8/1973 | Morgan | 283/81 |
| 4,001,072 | 1/1977 | deNedui | 156/204 |
| 4,184,701 | 1/1980 | Franklin et al. | 283/81 |
| 4,551,373 | 11/1985 | Conlon | 283/81 |
| 4,556,442 | 12/1985 | Torbeck | 156/384 |

OTHER PUBLICATIONS

Mercury Printing Inc. Product Brochure.
Photocopy of Prototype Label Produced by Mercury for Cetus Corporation.
Accraply Inc., Article, Unknown Journal, Jun. 1980.

*Primary Examiner*—Paul A. Bell
*Assistant Examiner*—Paul M. Heyrana, Sr.
*Attorney, Agent, or Firm*—William Benz; Janet E. Hasak; Albert P. Halluin

[57] ABSTRACT

An improved blind label is disclosed which includes a combination of open text and blinded text arrayed upon adhesive-backed label stock in an arrangement in which the label is divided into two sections joined by a tearable separation zone. In this improved label the first section is permanently affixable to the container to be labeled by its adhesive. The second section, carrying at least a portion of the blinded text, is strippably affixable to the container or to the first section by means of its adhesive backing. In certain embodiments, the blinding is accomplished by means of an opaque overcovering strippably adhered over the text with tamper-evident metallic layers being preferred overcoverings. An automatic labeling machine-compatible blind-label feedstock is also disclosed.

13 Claims, 5 Drawing Figures

BLIND LABEL

BACKGROUND OF THE INVENTION

1. Field of the Invention

This invention relates to adhesive labels and their use on containers. More particularly, it concerns improvements in adhesive blind labels, that is, labels which contain information which is covered up or "blinded" so that the users or some portion of the users cannot have access to it.

2. General Background and Prior Art

Usually, labels are provided to convey information. At times, however, it is essential that labeling materials be capable of carrying information but withholding some of it from direct access by casual examination. A good example of this arises during comparative tests of drugs and other products where it is essential to impartiality and to reliable test results that the parties directly involved in the test procedure not know whether or not they are actually testing the new material. Such tests are often referred to as "blind" tests or, in the preferred case where both the test subject and the person administering the test are kept in the dark, "double-blind" tests.

Conventionally, blind labeling of products has been carried out on an individual basis with the labeler attempting to conceal the blind information in a foolproof manner and the test subjects often diligently hunting for clues and hunches to circumvent the blinding. Recently, Mercury Pringting Inc., of New Brunswick, N.J., introduced a commercial double-blind label which relies upon a "scratch off" coating to blind certain information. These labels have been provided as perforated sheet stock. They are suitable for manual application to containers but can not be used in automated labeling machines that commonly use roll stock or individual labels. These labels also have the disadvantage that when they are applied to a container they provide their record of use as an extended tear-off tab which interferes with close-packed storage of the containers.

A properly designed label for a double-blind study will accomplish several critical objectives:

1. The label will display all information vital to the investigators and, in the case of drugs, comply with FDA regulations for the labeling of drugs.

2. To qualify for blind study use with drugs, label copy must include the drug's identity without revealing this information to any unauthorized group of people.

3. A portion of the label must remain permanently on the primary drug container. Ideally, the label should also have a portion which the investigator can remove and place in the test subject's records or in other records of the test.

It is an object of the present invention to provide a label which meets the requirements of blind studies and which can be applied to containers with conventional automatic labeling equipment. It is a further object of this invention to provide labeled containers which are suited for double-blind studies.

STATEMENT OF THE INVENTION

It has now been found that an improved blinded label includes a combination of open text and blinded text arrayed upon adhesive-backed label stock in an arrangement in which the label is divided into two sections joined by a tearable separation zone. In this improved label the first section is permanently affixable to the container to be labeled by its adhesive backing. The second section, carrying at least a portion of the blinded text, is strippably affixable to the container or to the first section by means of its adhesive backing. In certain embodiments of this invention, the blinding is accomplished by means of an opaque overcovering strippably adhered over the text, with tamper-evident layers or overlabels being preferred overcoverings.

In other aspects this invention provides an automatic labeling machine-compatible blind label feedstock. Such a feedstock is made up of a plurality of the blind labels as described above affixed serially and with defined spacing to an automatic labeling machine-feedable strippable continuous backing.

In an additional aspect this invention provides blind-labeled containers which are made up of a container, such as a container of a drug product having affixed to its outer surface a blind label of the type herein described.

The labels of the present invention offer particular advantages for labeling drugs for large-scale testing programs in that they will run on highly integrated, up-to-date, automated packaging lines without compromising Good Manufacturing Practices. Variable label copy, e.g., test protocol number, random patient number, drug name, and potency can be imprinted on the labels using automatic equipment which also covers up the data that must be blinded.

DETAILED DESCRIPTION OF THE INVENTION

BRIEF DESCRIPTION OF THE DRAWINGS

In this specification, reference will be made to the accompanying drawings in which

FIG. 4 is a six-part figure showing a sequence in which FIG. 4A shows a label of the invention being applied to a drug vial, FIG. 4B shows the vial with the label applied for storage prior to use of the drug, FIG. 4C shows the vial with the removable portion of the label peeled off, FIG. 4D shows the drug vial in use or in post study storage with the vial portion of the label in place but with the removable portion removed, FIG. 4E shows the removable portion of the label as it might be inserted into records of the drug study and FIG. 4F shows the removable portion of the label as it might be present in the records of the drug study with the "blinding" removed to uncover the blinded information.

DESCRIPTION OF PREFERRED EMBODIMENTS

Figure 1:
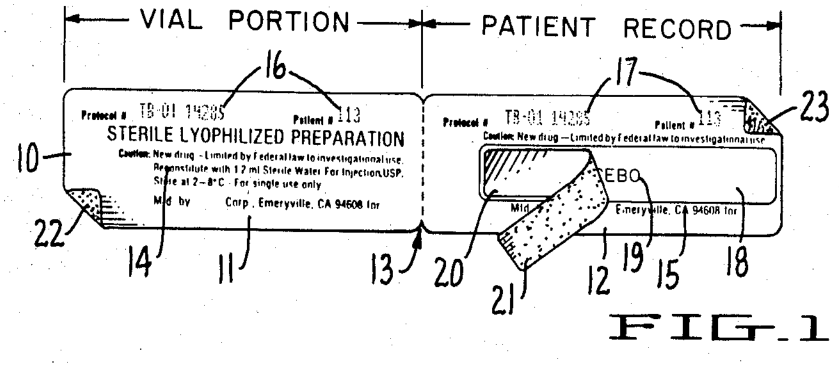
FIG. 1 is a view of the front of a blind label of this invention.

Turning to the drawings, FIG. 1 illustrates a front view of a blind label in accord with the present invention. This label, label 10, will be described in terms of a preferred embodiment of the invention which is used to label vials of experimental drugs for use in double-blind drug studies. It will be appreciated by those skilled in the art that the labels could be used in any other setting in which blind labeling is desired and on any type of container. A few examples of such other applications include consumer tests of new foods, soaps, cosmetics, and the like. Likewise, it will be appreciated that any use of the record of the drug as will be described could be replaced by any other type of record keeping desired.

Label 10 is made in two sections, a vial portion 11 which is the portion which will remain on the vial in use, and a patient record portion 12 which will be removable therefrom. The separation of the two portions of the label is carried out along separation zone 13. Zone 13 is depicted as a perforation line but could be any other configuration that would control the position of the separation of the two portions, such as a crease or a thinning of the label stock.

Label 10 is formed from any appropriate label stock sheet, such as paper, sheet plastic, metalized sheet plastic, or the like. It is generally preferred to use a label stock which is relatively nonstretchable as this makes it easier to register the various printing steps properly on the stock, as will be set forth below. For example, polyethylene and other relatively nonstretchable plastic films are preferred over mylars or sarans, which would be more stretchable. The face material of label 10 is imprinter compatible so that data can be applied to the face of the label by various conventional printing devices at any time prior to the application of the label to the sample container.

Portions 11 and 12 are shown with fixed information 14 and 15 imprinted on their faces respectively. Likewise, they each contain "open" or visible variable information 16 and 17, respectively, imprinted on their faces. This information serves in this preferred embodiment to identify a randomly assigned patient number and test protocol but could as well provide other information to assist in tracking the sample and the record of the test. Portion 12 carries a blind field 18. If desired, portion 11 could contain a blind field as well. Blind field 18 is an area on portion 12 which can contain information which will be kept secret from the health care professional who uses the drug and from the patient during the drug test. This information 19 could be the identity of the contents of the vial, e.g., "PLACEBO", "DRUG", "ACTIVE", "ASPIRIN, 2 gr", or the like. This information may be printed on label 10 at the same time the "open" variable information is applied, or at a different time if more convenient. Blind information 19 is blinded by cover, i.e. overlabel, 20. Cover 20, along with portion 12, must have the property of completely preventing detection of the blinded information. Cover 20 can be a layer of opaque coating or paint or it can be an applied sheet of opaque material. This opaque sheet can be made of any sheet material that is compatible with the other label components and that is tightly bondable to the label thoughout its range of flexibility. Examples of such materials are paper, vinyl, acetate, metal foil, metalized plastic and combinations thereof with or without added printing or coatings to enhance opacity. This sheet is applied, i.e. overlabeled, onto information 19 in field 18 such as by the use of adhesive layer 21. In a preferred embodiment, cover 20 is tamper-evident. That is, it is capable of indicating if an attempt has been made to uncover the information underneath it such as by peeling it off or probing underneath it.

Both portions 11 and 12 of label 10 are backed with adhesive 22 and 23 respectively to permit portion 11 to be affixed to its container and to permit portion 12 to adhere to the container, or if the label wraps around the container and overlaps, to portion 11 during storage and thereafter to affix portion 12 into records such as patient records or study records. The adhesives 22 and 23 may be applied over the entire back surfaces of sections 11 and 12 respectively or may be applied only to a portion of the back surfaces so long as the resulting application gives rise to the required permanent adhesion of section 11 to the container and the strippable adhesion of section 12 to the container or to section 11 and the adhesion of section 12 into records. The particular adhesive or adhesives employed as 22 and 23 are not critical, and any material compatible with the conditions of fabrication, application, and use can be employed. Such materials can be water soluble if appropriate but more commonly are organic-solvented materials such as butyl rubber-based adhesives or the like. Most commonly, the adhesives employed as 22 and 23 and also as 21 are pressure-sensitive adhesives.

Figure 2:
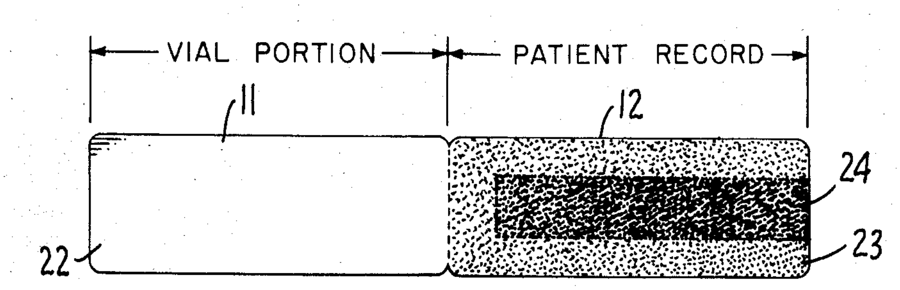
FIG. 2 is a view of the back of a blind label of this invention.

As shown in the embodiment of FIG. 2, the adhesive properties of the material on the back of portion 11 are different from the properties of the material on the back of portion 12. In this preferred embodiment, the strength or tackiness of adhesive 22 on portion 11 is greater than the strength or tackiness of adhesive 23 on portion 12. This offers the following advantages. First, it facilitates removal of portion 12 when it is adhered to the container or to portion 11. Second, it reduces the chances that adhesive 23 will inadvertently pick up or remove any of the information present on portion 11, such as the fixed information or the open variable information. Third, this differential adhesion will promote proper separation of the two portions at zone 13—the first portion peeling off easily and the second portion resisting peeling and permitting the desired separation at zone 13. This differential adhesion can be achieved by the use of different adhesives or by the application of an additive or the like to one portion or the other so as to promote or diminish its adhesive properties. For example, one could apply a light coat of oil to the back of portion 12 so as to decrease its adhesion. Similarly, as shown in FIG. 2 an oil-based ink or the like could be differentially applied to adhesive 22 and not to adhesive 23 to achieve the same result. Also as shown in FIG. 2, this application of ink can be further controlled so as to provide back-blinding 24 to the blind field, if desired.

Figure 3:
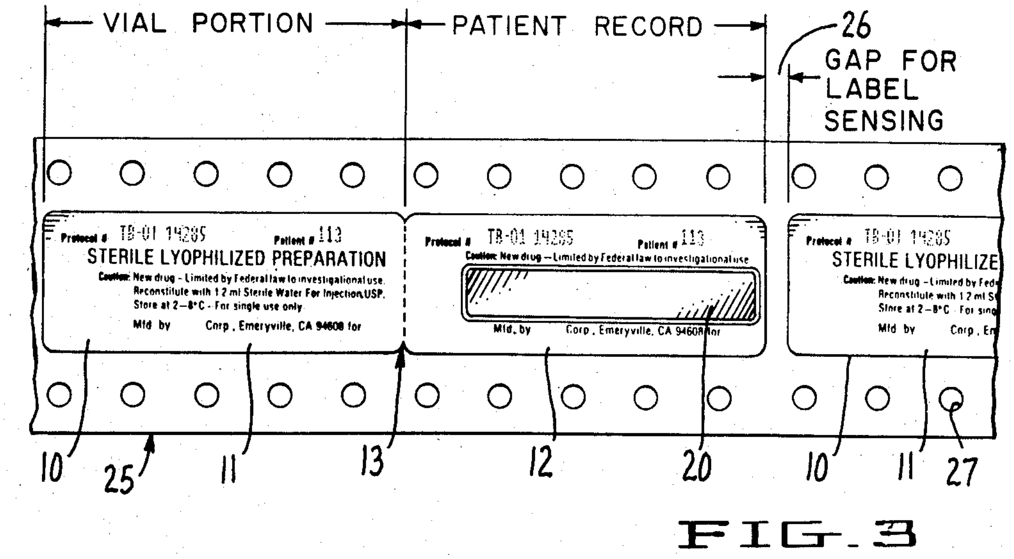
FIG. 3 is a front view of a piece of continuous label stock for use in applying labels of this invention with automatic labeling equipment.

A major advantage of the labels of this invention is their ability to be fed to and applied by automated, automatic, or semiautomatic labeling machines. As shown in FIG. 3, for this application it is desirable to supply the labels as a continuous roll stock. In this form, a plurality of labels 10 each made up of portions 11 and 12, separation zone 13, and blind field cover 20 are serially arrayed on a continuous web or backing 25 generally in the narrow-edge-leading configuration shown. Backing 25 is preferably made of a material from which the labels may be easily removed, for example, a waxed or silicon-treated paper or the like. The serially arrayed labels are accurately placed on the backing 25 such as by being accurately spaced with consistent gap 26. This controlled spacing makes it easier to automatically prepare and apply the labels as is desired. Backing 25 is shown as having tractor feed holes 27. Again, these are merely representative of means for accurately moving the label stock into the printing and application equipment.

Figure 4:
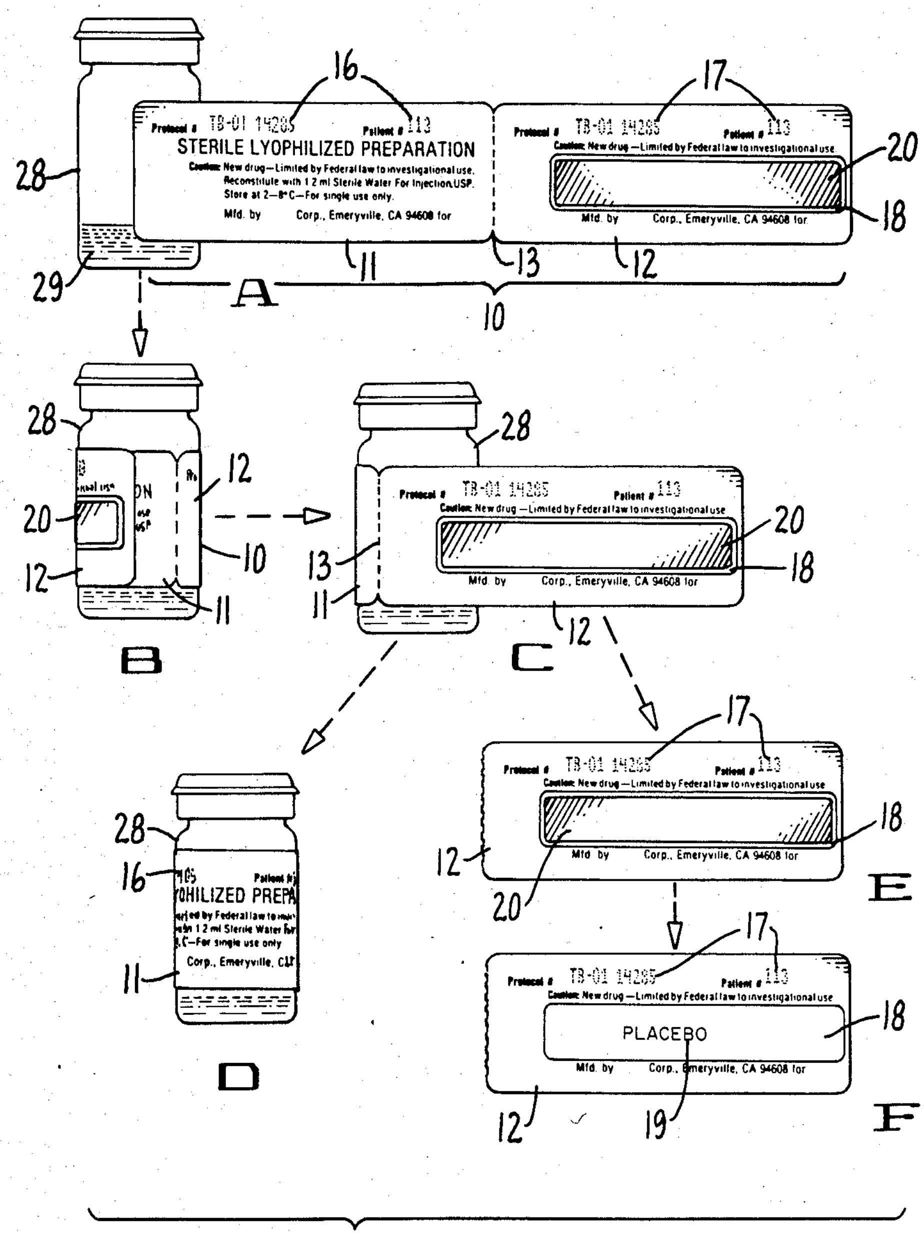

Turning to FIG. 4, a sequential diagram of a typical use of the present labels is provided. In FIG. 4A a label 10 is shown being applied to vial 28 which contains drug 29. Label 10 includes section 11 which will strongly adhere to vial 28 as a permanent record and section 12 which is separable from 11 along perforation line 13. Section 11 contains open variable information 16, such as the protocol and random patient number shown in FIG. 4A imprinted on its face. Section 12 contains similar open variable information 17 as well as blind field 18 which is blinded by cover 20.

In FIG. 4B vial 28 is shown with label 10 applied. Section 12 overlaps section 11 in this embodiment because section 11 has been sized to have a length similar to but somewhat less than the circumference of vial 28, typically from about 0.7 to about 0.95 times this circumference. This sizing of section 11 allows visual access to the contents of vial 28 and permits relatively large labels to be applied to relatively small vials. This is beneficial as it allows larger, more readable print to be used and minimizes errors. Section 11 and section 12 are depicted in the figures as being about the same size. This is not a requirement of this invention, however. Section 12 can be larger or smaller than section 11, if desired. Section 12 can wrap around container 28 more than once if desired because the lower-tackiness adhesive on its reverse side will not lift off any copy or disturb or compromise the integrity of blinding cover 20. Section 11 remains attached to vial 28 for convenient storage and handling.

In FIG. 4C the removal of section 12 from the vial 28 is shown. Section 12 of label 10 can be peeled off of the vial. The adhesive backing on section 12 is such that this removal is possible without destroying or diminishing the quality of the information printed on section 11. When section 12 is removed, it takes blind field 18 with cover 20 with it. Sections 11 and 12 can be separated by tearing along perforation 13. This results in the formation of vial 28 carrying label section 11 (as shown in FIG. 4D) and a separate label section 12 (as shown in FIG. 4E). Label section 11 contains open variable information 16 so as to be specifically identifiable throughout its use. Section 12 similarly contains open variable information 17 to permit its specific identification and insertion in proper records. The adhesive on the back of section 12 advantageously is a multiple-use adhesive so that it can be used to affix section 12 into these records. It will be noted that throughout this use cycle cover 20 remains intact and in place and effectively blinds the information contained in blind field 18 to insure a properly unbiased test result.

As shown in FIG. 4F, blinding cover 20 can then be removed by scraping, peeling, special solvent wash, or the like to expose the blinded information which is presented together with the open variable information on a single tag or record. This minimizes the possibilities of confusion or transposition of data and again helps to improve the reliability of the test documentation.

Figure 5:
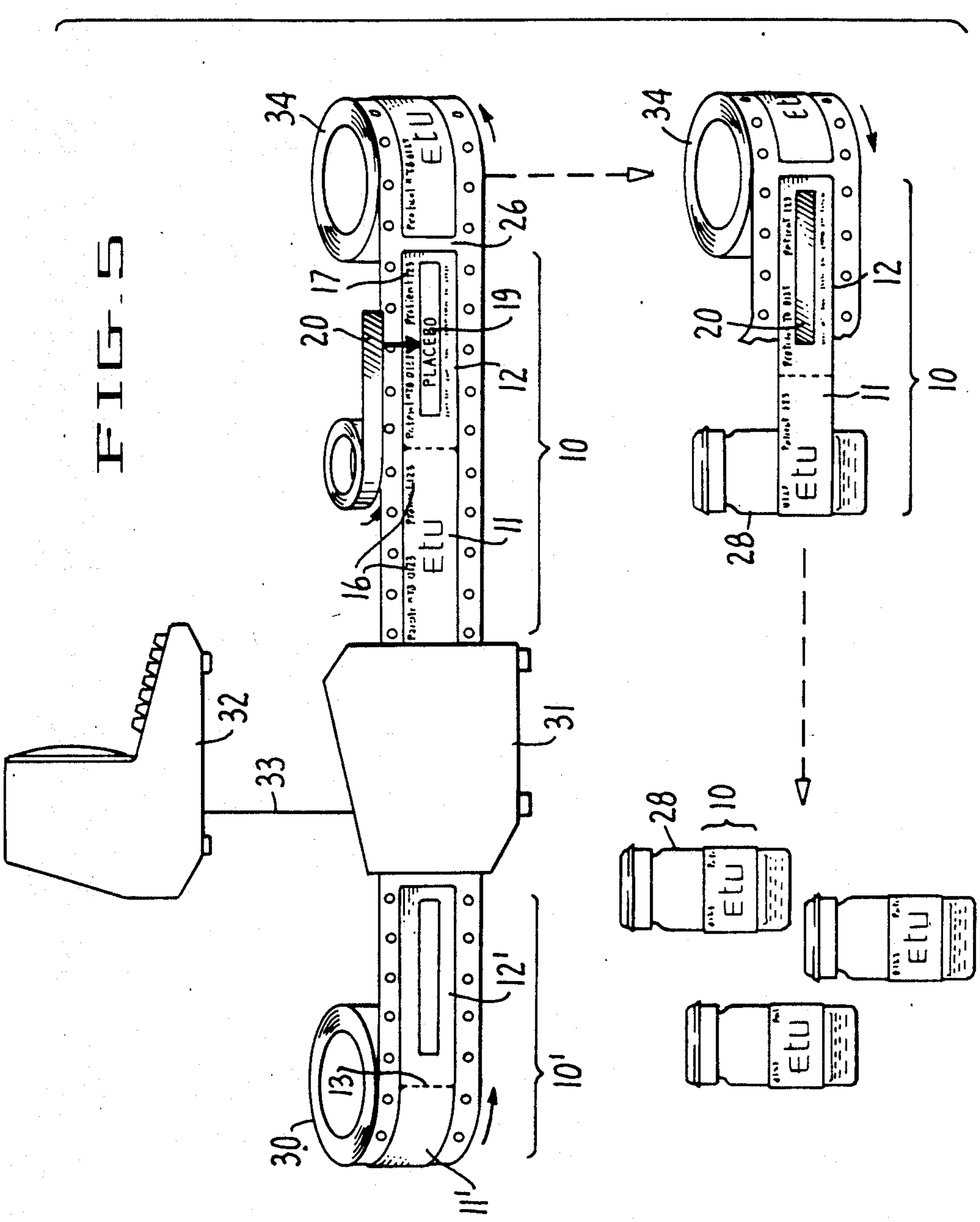
FIG. 5 is a sequential flow diagram illustrating a process by which labels of the present invention may be prepared and applied to containers.

An advantage of the present invention is its applicability to automated label production systems. FIG. 5 is a schematic flow diagram illustrating an example of the production and use of these labels in such a system. A roll of label stock 30, which in practice would have a backing or web to facilitate continuous feeding that is not shown in this figure, supplies blank labels 10', which each contain a section 11' and a section 12' joined by separation zone 13. This stock is fed into label printer 31. If the label sections have the preferred differential adhesive, this usually has been applied or accomplished by modification of the adhesive layer before the labels are finally imprinted for use. Printer 31 is controlled through line 33 by computer input station 32 which is programmed to apply the variable data for each individual lot of labels (e.g., protocol number, patient number, product name, etc.) and imprints some or all of the following information on sections 11 and 12 of labels 10: fixed text, open variable text 16 and 17, and blinded text 19. Upon leaving the printer, the blind field of the labels is immediately covered by automatic application of blinding material 20 over text 19. The printed and blinded labels are then rewound as roll 34. All of these steps can be carried out on conventional equipment—for example, an APAX 6500 roll feed and rewind attachment (APAX Corp. Fullerton Calif., 92631), a Printronix dot matrix label printing machine and a Label-Aire Tamp-Blow Applicator Model 2114 (for blind field overlabeling). The use of such automated equipment permits two accurate quality control steps in the process. First, a hard-copy print of the computer program that controls the printer can be retained by the quality control officer. Second, a duplicate set of labels, usually without blinding layer 20, can be run off and retained.

The rewound rolls of labels 34 are placed on a standard labeling machine such as an Avery Universal Labeling Machine, Model 7005WA and labels 10 are automatically applied to vials 28. The labeling machine applies section 11 of the label to the vial for permanent adherence. Section 12 will automatically follow the configuration of the vial, but because it has the reduced adhesion backing, will not remain permanently affixed to the vial and later can be lifted off with ease by the user of the vial for separation and insertion into laboratory records or the like.

Several major benefits flow from the use of this invention. It is possible to purchase generic label stock and imprint labels in-house with specific data for each product and lot. Automatic imprinting and labeling realizes substantial labor savings and reduces the chances for human error that can result when labels are coded manually with variable data. Security is improved, as well; with computer technology, access to critical information can be restricted to fewer individuals.

Although this invention has been described with reference to a preferred embodiment, it will be appreciated that the invention is not limited to this embodiment and that its scope is as defined by the following claims.

What is claimed is:

1. In a blinded label having a combination of open text and blinded text arrayed upon adhesive-backed label stock, said label stock being present as two sections joined by a tearable separation zone, the improvement comprising presenting at least a portion of the blinded test on the second of the two sections and differentiating the adhesive on the two sections such that the adhesive on the back of the first section is greater in strength than the strength of the adhesive on the back of the second section, said adhesive on the back of the first section being of a strength to render first section permanently affixable to the container to be labeled and said adhesive of the back of the second section being of a strength of render said second section strippably affixable to the container or to the first section by means of its adhesive backing.

2. The blind label of claim 1 wherein the blinded text is blinded by means of an opaque overcovering strippably adhered over the text.

3. The blind label of claim 2 wherein the overcovering comprises an overlabel.

4. The blind label of claim 3 wherein the overlabel comprises tamper evident means.

5. The blind label of claim 4 wherein the label stock comprises substantially nonstretchable flexible plastic.

6. An automatic labeling machine-compatible blind label feedstock comprising a plurality of the blind labels of claim 5 affixed serially and with defined spacing to an automatic labeling machine-feedable strippable continuous backing.

7. A blind-labeled container comprising a container having affixed to its outer surface a blind label of claim 5.

8. The blind-labeled container of claim 7 wherein the container has a circumference substantially equivalent to the length of the first section of the label and wherein the label is applied circumferentially such that the first section is adhered to the container and the second section is adhered at least in part to the first section.

9. The blind label of claim 1 wherein the label stock comprises substantially nonstretchable flexible plastic.

10. The blind label of claim 1 wherein the first and second sections each contain blank spaces into which variable open text can be imprinted.

11. The blind label of claim 1 wherein the tearable separation zone is a series of perforations.

12. An automatic labeling machine-compatible blind label feedstock comprising a plurality of the blind labels of claim 1 affixed serially and with defined spacing to an automatic labeling machine-feedable strippable continuous backing.

13. A blind-labeled container comprising a container having affixed to its outer surface a blind label of claim 1.

* * * * *